Nov. 13, 1962

G. R. ASCHAUER 3,063,531

FRICTION PLATE CLUTCH

Filed Nov. 12, 1958

Inventor.
George R. Aschauer.
By Johnson Dailey
Attorney.

Nov. 13, 1962

G. R. ASCHAUER 3,063,531

FRICTION PLATE CLUTCH

Filed Nov. 12, 1958

Inventor.
George R. Aschauer.
By John W Darley
Attorney

Nov. 13, 1962  G. R. ASCHAUER  3,063,531
FRICTION PLATE CLUTCH
Filed Nov. 12, 1958  4 Sheets-Sheet 3
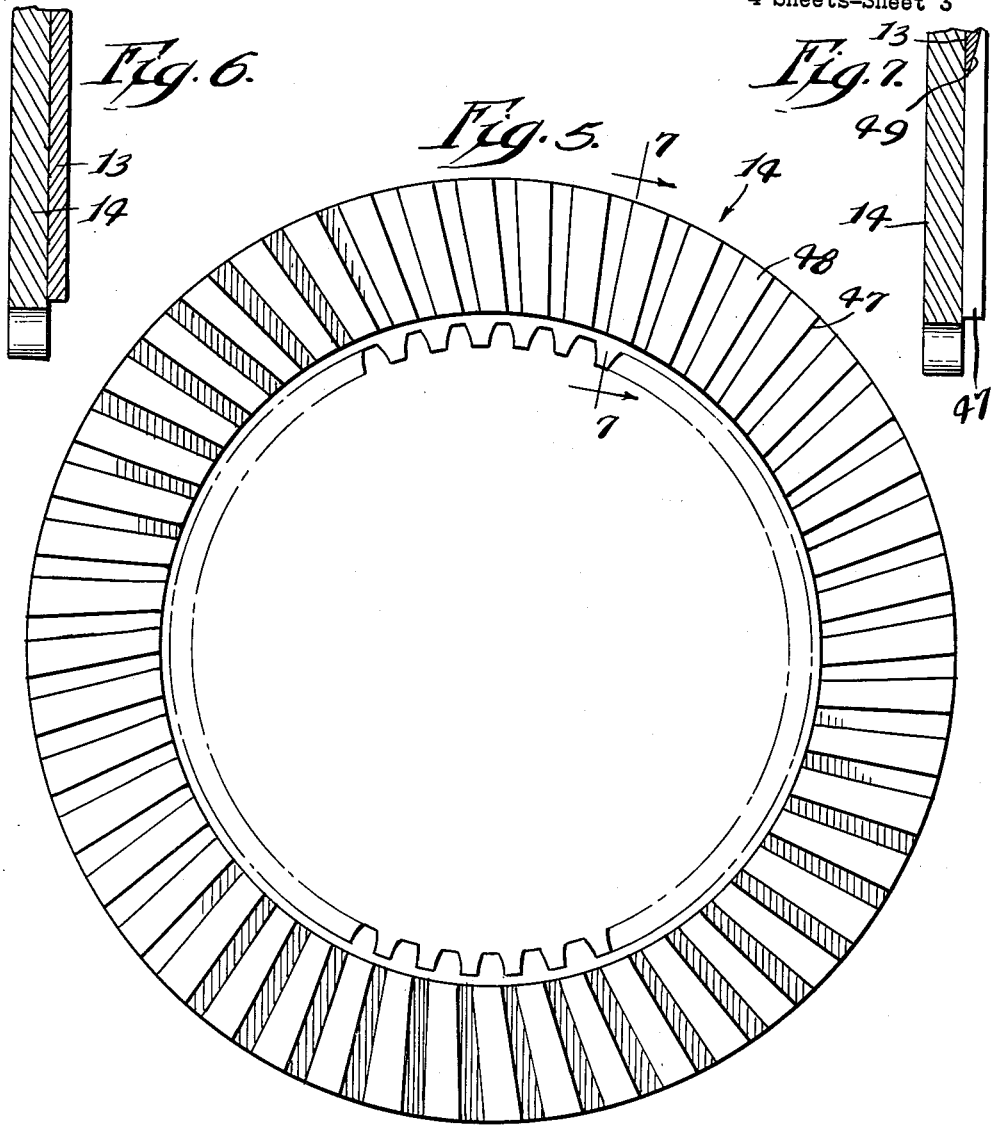
Fig. 6.
Fig. 5.
Fig. 7.
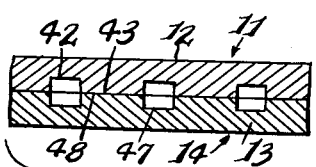
POSITION A.
Fig. 8.
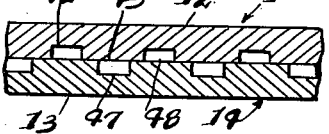
POSITION B.
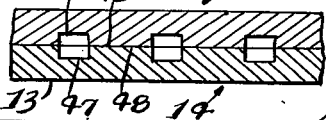
POSITION C.
Inventor.
George R. Aschauer,
By John O. Darley
Attorney.

Inventor.
George R. Aschauer

United States Patent Office 3,063,531
Patented Nov. 13, 1962

3,063,531
FRICTION PLATE CLUTCH
George R. Aschauer, Racine, Wis., assignor to Twin Disc Clutch Company, Racine, Wis., a corporation of Wisconsin
Filed Nov. 12, 1958, Ser. No. 773,251
3 Claims. (Cl. 192—113)

My invention relates to friction clutches of the plate type and is concerned primarily with insuring an adequate cooling of the plates of a high speed clutch as the plates are moved to full engagement.

The heat generated at this time between a pair of simple clutch plates, for example, having flat, annular mating surfaces is trapped between such surfaces and can only be dissipated to some extent after conduction through the plates by air flow over other surfaces of the plates created by rotation thereof. Solutions of this problem have usually consisted in either grooving one of the mating surfaces for the radially outward passage of cooling oil, or by attaching to one of the plate surfaces friction, button-like members which provide spaced rubbing surfaces for coaction with the surface of the other plate, a cooling fluid being flowed between the buttons.

In the grooved arrangement, the cooling oil is in direct contact with the working surface of the ungrooved plate so that the heat exchange may be acceptable, but heat generated at the working surfaces of the grooved plate, i.e., between the grooves, must be conducted through the plate before reaching the relatively shallow, side walls of the grooves. Accordingly, the heat exchange rate for the grooved plate is poor. The same situation obtains for the rubbing surfaces of the friction buttons for obvious reasons.

Other solutions have proposed radial grooves or spiral grooves in the mating surfaces of the plates, but such arrangements have failed to produce desirable results because of the unfavorable heating to cooling cycle and radical variations in the contact area as the plates relatively move.

The above heat problem becomes acute in very high speed clutches, such as those characterized by a speed of up to 7000 r.p.m. and higher. With the driving plate or plates rotating at such a high speed and the driven plate or plates connected either to a quiet load or one operating at a speed substantially lower than the input speed, the appreciable time necessary to effect engagement between the rubbing surfaces at this speed generates such severe heat that the plates become warped or dished so that the capacity for full frictional contact is lost. This warpage is due to the excess surface growth of the working surface of each plate beyond the elastic limit of the plate metal to thus cause dishing of the plate when cooled. In other words and under the conditions noted, the heat cannot be conducted with sufficient rapidity away from the working surfaces of and through the bodies of the plates to prevent this warping.

It is therefore one object of my invention to provide a clutch having annular friction plates whose opposed surfaces are conditioned in a manner that during the period in which the plates relatively rotate when moved to full engagement and considering a point on any working or friction portion of such surface, it is alternately worked and cooled by a coolant flowing outwardly between the surfaces and under conditions providing a favorable heating to cooling cycle.

A further object is to provide a clutch as set forth in which the contact area of the plates does not vary radically during relative movement of the plates before reaching full engagement.

A further object is to provide a clutch of the character indicated in which the conditioning of each working face of a clutch plate takes the form of a plurality of straight coolant grooves or channels extending from the inner to the outer periphery of the plate in directions other than radial and including as between a pair of coacting plates radial and non-radial grooves on such plates, respectively.

These and further objects of the invention will be set forth in the following specification, reference being had to the accompanying drawings, and the novel means by which the objects are effectuated will be definitely pointed out in the claims.

This application is a continuation-in-part of my copending application for Friction Plate Clutch, Ser. No. 654,341, filed April 22, 1957, now abandoned.

In the drawings:

FIG. 5 is a side elevation of the working face of each end or driven clutch plate shown in FIG. 1.

FIGS. 6 and 7 are enlarged sections along the line 7—7 in FIG. 5 showing, respectively, the working surface of each end plate before and after the formation of the cooling medium grooves.

FIG. 8 is a fragmentary, schematic, sectional view showing three relative positions assumed by the driving plate and a driven plate during the relative rubbing period.

Figure 1:
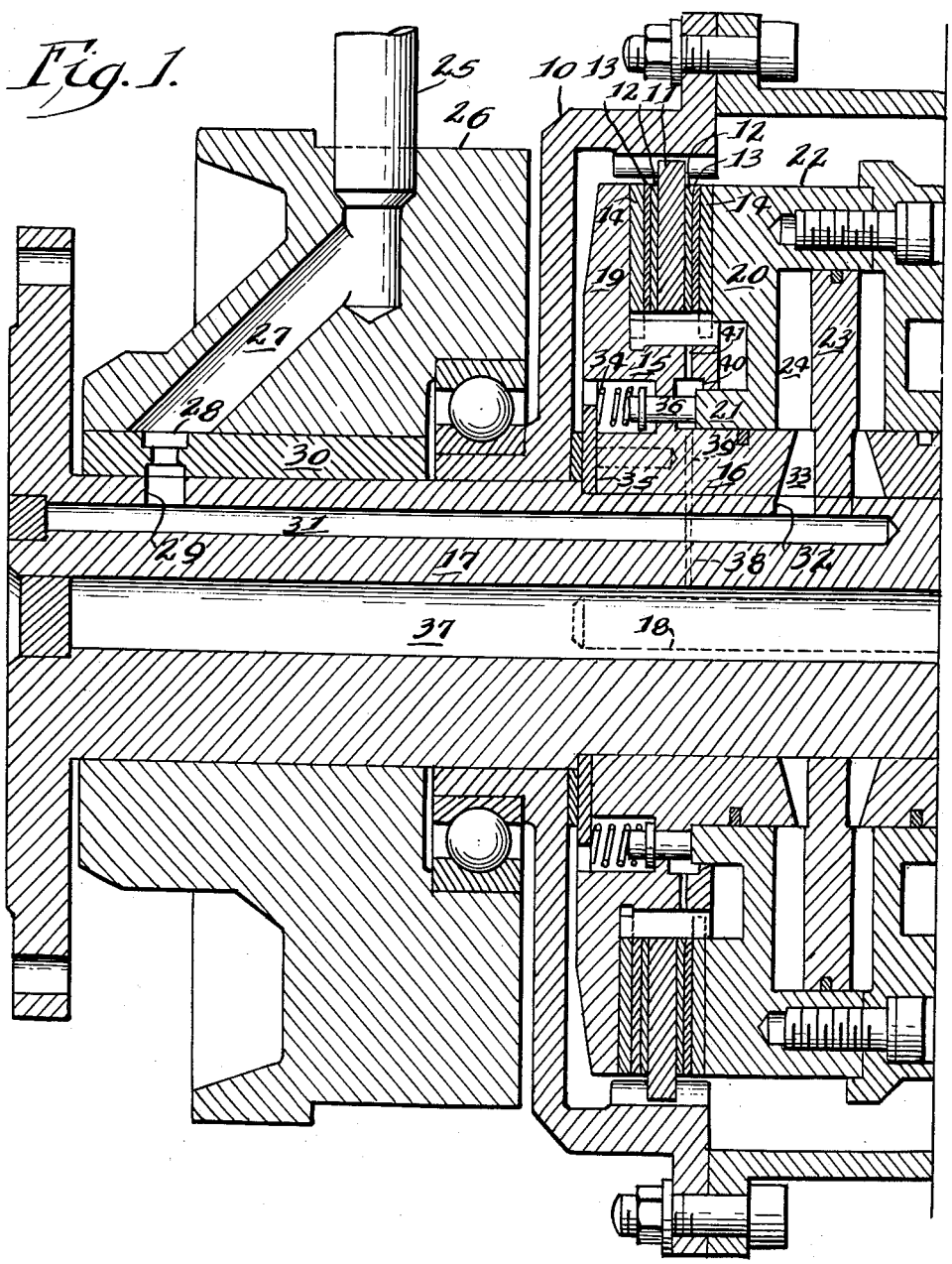
FIG. 1 is a sectional elevation of a typical, hydraulically operated, friction clutch embodying the invention, the clutch being shown in engaged position.

Referring to FIG. 1, there is shown by way of illustration a typical hydraulically operated, friction clutch in engaged position, although the precise manner of engaging and releasing the clutch is not important, the essence of the invention residing in the manner of cooling the plates, particularly during the rubbing period from initial contact to full engagement.

An annular shell 10, denoted for convenience as the driving member, is internally toothed for driving engagement with an externally toothed and relatively slidable, driving clutch plate 11 having suitably bonded to opposite sides thereof a sintered metal composition constituting wear faces 12—12. Engageable with the faces 12—12, respectively, are like wear faces 13—13 bonded separately to driven clutch plates 14—14. The particular composition of the wear faces 12 and 13 is not restrictive, but is intended to be generally representative of any type of wear face that is suitable for clutch service. Further, the terms "driving" and "driven" are intended to only denote a suggested direction of drive since the latter could be reversed through the clutch without affecting the scope of the invention.

The driven plates 14 are internally toothed for driving and relative slidable engagement with a shouldered annulus 15 forming part of a hub 16 that is rotatably secured to an output shaft 17 by a key 18. Preferably integrally formed with the hub 16 is an abutment plate 19 against which the clutch plate stack is gripped by an annular piston 20 whose inward portion 21 is slidable on the hub 16 and which also includes an outer, annular wall 22 that is slidable on the outer, peripheral surface of a ring 23 that may be integrally formed with the hub 16.

The hub 16, piston 20, wall 22 and ring 23 define an annular cylinder 24 for receiving an actuating medium which, by way of example, will be assumed to be a suitable oil. This oil is supplied under any desired valving control that is well known in the field of hydraulically operated clutches and such that actuating pressure can be admitted or denied to the cylinder 24 at will. In the particular arrangement shown, the clutch actuating oil flows successively through a pipe 25 having its outlet end connected to a fixed frame member 26, a passage 27 in this member, a passage 28 in a sleeve 30 interposed between the member 26 and shaft 17, a radial passage 29 and a longitudinal passage 31 in the shaft 17, and radial passages 32 and 33 in the shaft 17 and hub 16, respectively.

The clutch is shown engaged in FIG. 1 and when the actuating pressure is cut off, the piston 20 is returned to release position to thereby permit separation of the clutch plates 11 and 14 by means of a plurality of springs 34 spaced around and recessed in the hub 16. Each spring 34 has one end abutting a fixed ring 35 and the opposite end bearing against one end of a pin 36 slidable in the hub and whose opposite end abuts the piston portion 21.

Provision is also made for supplying cooling oil to the plates 11 and 14 in their engaged and disengaged positions by admitting such oil under well known control to the right end of an axial passage 37 in the shaft 17 from which it flows radially and successively outward through a passage 38 in the shaft 17, a passage 39 in the hub 16, an annular chamber 40 and a plurality of passages 41 in the hub annulus 15. This passage means therefore delivers the cooling oil to the toothed periphery of the annulus 15 and hence to the inner portions of the clutch plates 11 and 14.

So far as described, the structure shown in FIG. 1 is intended to be generally representative of any type of friction plate clutch without regard as to how the plates are engaged and released. The sole restrictive factor, so far as the general assembly is concerned, is that a flow of a coolant, such as a suitable oil, be maintained to the inner edges of the several clutch plates for cooling the same since the essence of the invention resides in the manner of conditioning the working or mating faces of any pair of the plates so that both of the surfaces are adequately cooled, particularly under conditions of high speed operation and during the period from initial contact of the plates to full engagement.

For convenience of disclosure, the principal friction elements of the clutch are shown as consisting of three plates, namely, the driving plate 11 which is flanked by the driven plates 14—14. However, it will be understood that the number of plates is not important to the conception and that the plate stack may consist of two plates or more than three.

Figure 2:
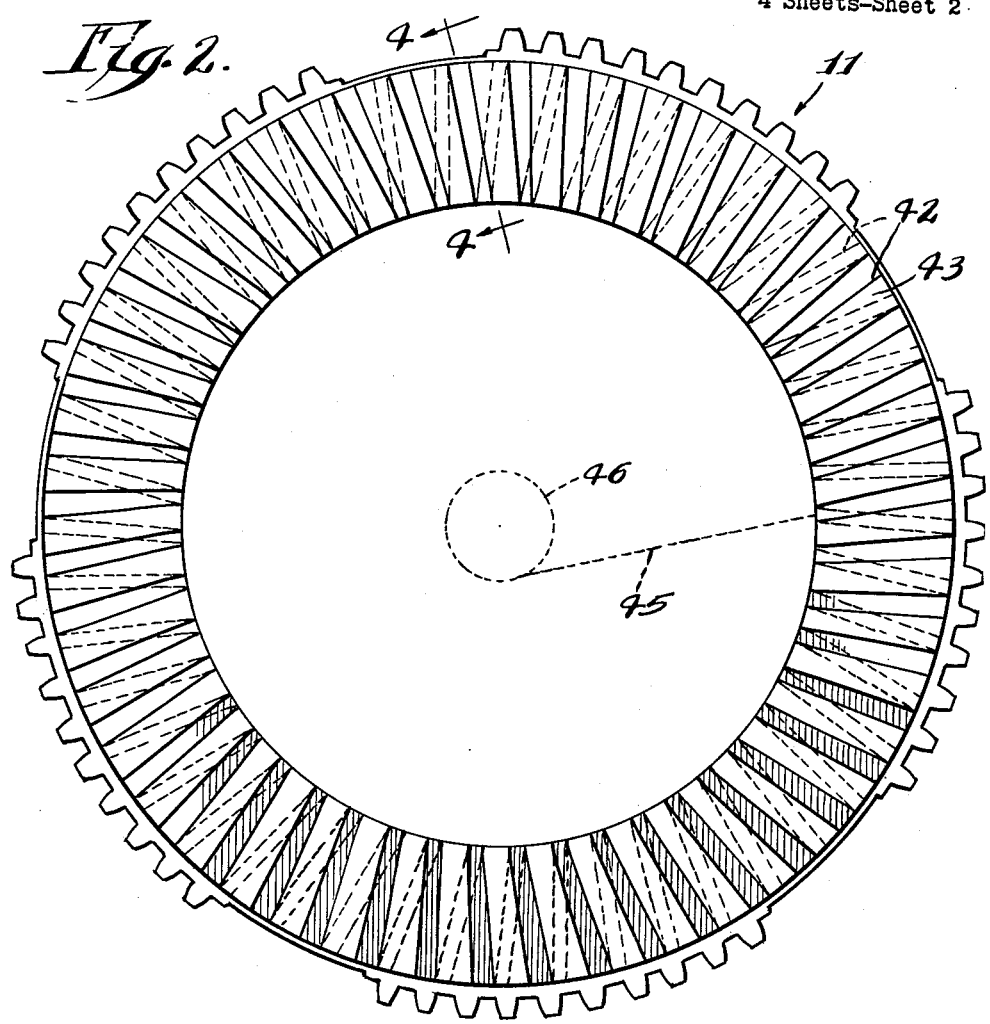
FIG. 2 is a side elevation of the center or driving clutch plate shown in FIG. 1.
Figure 3:
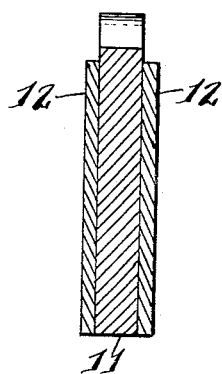
FIGS. 3 and 4 are enlarged sections along the line 4—4 in FIG. 2 showing, respectively, the working surfaces of the center plate before and after the formation of the grooves for receiving the cooling medium.
Figure 4:
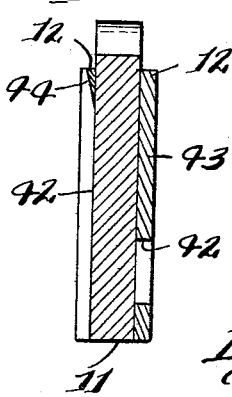

Referring to FIGS. 2 to 4, inclusive, which shows the driving plate 11, the wear faces 12—12 thereof include a plurality of preferably tapered grooves 42 extending in an enlarging direction from the inner to the outer peripheries of the faces and equispaced therearound. The formation of the grooves 42 creates a plurality of lands 43 which constitute the actual working surfaces of the plate 11 and the outer or delivery end of each groove 42 is constricted as indicated by the numeral 44 in FIG. 4 to thereby, in conjunction with the coacting plate, exercise a throttling control on coolant flow through the groove which provides time for adequate heat transfer to the coolant. Preferably, the wear faces 12—12 are provided on a molded annulus composed of the sintered metal composition and the grooves 42 and lands 43 are formed during the molding step.

One disposition of the grooves 42 is shown in FIG. 2 and it will be noted that the grooves are straight and extend along lines other than radial of the plate 11. In the arrangement shown, the center line 45 of each groove 42 is tangent to a circle 46 which is concentric with the plate 11. The grooves 42 are oppositely inclined on opposite sides of the plate 11 as respectively shown in full and dotted lines.

Each driven plate 14 includes on one side thereof a plurality of grooves 47 formed in the associated wear face 13 in the same manner as recited for the grooves 42 in the wear faces 12—12 and equispaced therearound and creating a plurality of lands 48 constituting the actual working faces of the plate. The grooves 47 are shaped and related in the same manner as the grooves 32, i.e., they extend non-radially from the inner to the outer periphery of the plate 14 and the outer or delivery end of each groove 47 is constricted as at 49 in FIG. 7 for the same reason as noted for the groove 42.

The advantages of the above grooved arrangement of the mating faces of a pair of clutch plates 11 and 14 is schematically shown in FIG. 8 wherein the sections are taken at the mean radius of each plate. Considering the plate 11 as rotating and the plate 14 as stationary or as rotating at a substantially lower speed than the plate 11, positions A, B and C represent generally an assumed relationship of several grooves and lands at first contact or initial rubbing of the plates, an intermediate or cooling stage, and a following rubbing or working stage.

In position A at the indicated mean radius, the lands 43 and 48 are in frictional contact; in position B, the same lands are cooled by exposure to the coolant moving through the grooves 47 and 42, respectively, while in position C, the lands 43 and 48 are again in frictional contact. In other words, the lands 43 and 48 at the indicated radius alternately rub and are cooled as the plates 11 and 14 relatively rotate from a position of initial contact to final tight engagement, an operation which at the contemplated high speed may obtain through several revolutions of the driving shell 10.

This working and cooling in alternate steps of the lands 43 and 48 occur over the full working surfaces thereof, but at different times for different points on the surface of any land. This condition is due to the non-radial positions of the grooves 42 and 47 and the fact that when the plate 14 is placed in mating relation to the plate 11, the respective grooves 47 and 42 thereof will occupy the same oppositely inclined relations as do the full and dotted grooves 42 in FIG. 2. Hence, and in any relative positions of the plates, there is always some portion or portions of each land on one plate that has a rubbing relation to another portion or portions of a land on the other plate during the period of moving the plates to full engagement. At the same time, there is always some portion or portions of each land on one plate that is being cooled by exposure to the coolant moving through the grooves of the other plate.

For optimum results with clutch plates of finite size, it has been determined that there are certain critical factors whose presence is necessary to secure commercially usable results.

I have ascertained that employing radial grooves in the opposed faces of a pair of clutch plates is objectionable because such a groove relation not only creates an unfavorable heating to cooling relation, but any attempt to widen the grooves to improve cooling results in the contact area variation approaching infinity.

Figure 9:
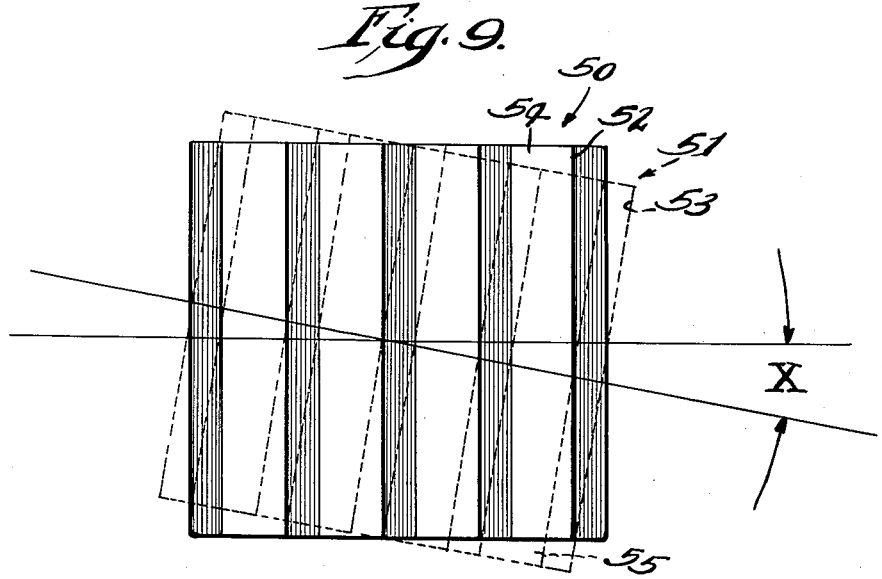
FIG. 9 is a schematic view relating to a theoretical consideration of the design.

For these and other reasons, the grooves 42 and 47 are oppositely inclined and the necessity for the inclination when the plates 11 and 14 are abutted can be understood by reference to FIG. 9. This figure represents a schematic, theoretical consideration involving fragments of two abutting clutch plates 50 and 51 which, for convenience, are shown in full and dotted lines, respectively, and whose diameters are infinitely large so that their inner and outer peripheries may be represented by horizontal lines. Spaced oil grooves 52 and 53 in infinite number and separated lands 54 and 55 are provided in the contacting portions of the plates 50 and 51, all respectively. If the plate 51 is inclined relative to the plate 50 at an angle X, termed the angle of inclination, as shown in dotted outline, the plates may be relatively moved in directions normal to the grooves 52 without any variation in percent of contact area.

With finite clutch plates, this constancy of contact can only be approached. The angle of inclination of the grooves will vary with the number thereof and for any selected number of grooves should be as small as possible. For any given size of plate, there is a practical limit to the number of grooves that may be used and, for the purpose of this invention, the number may vary from 24 to 200. The number selected will depend upon the size of the plate and the necessity for maintaining an adequate contact area for power transmission and the larger the number of grooves, the closer the approach will be to the theoretical angle of inclination of the grooves and the desired approach to area constancy of contact. In finite plates, the contact area must vary to some extent, but to fall within the purview of this invention, the contact area must not fall below 25% of the swept or gross area of the plate annulus or exceed about 66% of the latter area. Below 25%, the unit pressures would be excessive while above 66%, the cooling would be inadequate.

Generally speaking, the size of each clutch plate and the number of its grooves are determined from the usual clutch considerations involving the power source, the nature of the load, and the overall operating conditions, and the grooves are angled so that the contact area shall be maintained within the indicated set limits.

By way of example, and considering the plates shown in FIGS. 2 and 5 in abutting relation with the grooves 42 and 47 of the respective plates oppositely inclined, it will be asumed that the internal and external diameters of the friction surfaces thereof are 7.875" and 11.25", respectively. The swept or total area of each plate is therefore 50.69 sq. ins. For this relation of plates and considering them as relatively rotating in contact between positions of initial engagement and final engagement when the plates are locked together, it has been determined that the contact area varies from 22.40 sq. ins. to 14.85 sq. ins. Percentage-wise, the contact area varies from 43.90% to 29.90% of the swept area which, expressed as a ratio is a 1.47:1 variation. This ratio should not exceed 1.5:1.

A further limitation (see FIG. 5) is that the outer arc width of each land shall not be more than 1.5 times the inner arc width of the same land. This consideration is tied in with maintaining the contact area variation within the 1.5:1 ratio expressed above and this holds true regardless of the size of the plate annulus. The same land shapes also apply to the plate shown in FIG. 2.

A further factor is that, considering a revolution of one plate relative to the abutting plate as a sliding cycle, the contacting or heating portion and the cooling portion of this cycle should desirably have a 1:1 ratio, but since this relationship can only be approached in an actual clutch, one condition as to this aspect is that the heating portion shall not be more than twice that of the cooling portion. Specifically, as to structure, the latter condition is met by having the mean width of each land not more than twice the mean width of each groove.

Figure 10:
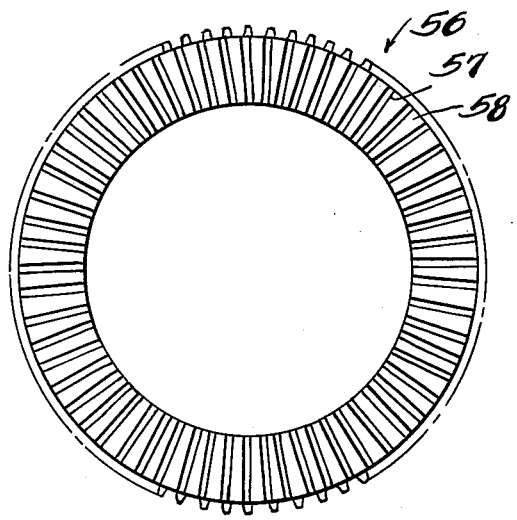
FIG. 10 is an elevation to reduced scale of a modified clutch plate having radial cooling grooves for use with the FIG. 5 plate.

In FIG. 10 is shown a typical clutch plate 56 having one fraction face provided with radial cooling grooves 57 which are separated by lands 58. When the plate 56 is mated with the plate 14 in FIG. 5, it will be apparent that the grooves in one plate are inclined oppositely relative to those in the other plate. The critical factors above also apply to this design variation.

I claim:
1. A rotary clutch comprising a pair of annular, friction plates respectively connectible to driving and driven parts and movable between positions of release and engagement, the opposing faces of the plates respectively including a plurality of grooves equispaced therearound and extending in directions other than radial from the inner to the outer peripheries of the plates, the center line of each groove being straight and each groove including a base and side walls which diverge from the inner periphery of the associated plate, means for continuously supplying a coolant to the inner ends of the grooves for flow outwardly therethrough, and lands providing friction surfaces located between and defined by the grooves, the grooves and lands on the faces of the respective plates being relatively oppositely inclined, the outer, delivery end of each groove being constricted to exercise a throttling control on the coolant flowing therethrough.

2. A clutch as defined in claim 1 wherein the mutual contact area of the lands is included in the range of 25% to 66% of the total swept area of the plates during relative rotation thereof.

3. A clutch as defined in claim 1 wherein the width of each land at the outer periphery thereof is not more than 1.5 times the width of the same land at its inner periphery.

References Cited in the file of this patent

UNITED STATES PATENTS

| | | |
|---|---|---|
| 1,717,522 | Rosenberg | June 18, 1929 |
| 2,020,748 | Waseige | Nov. 12, 1935 |
| 2,202,137 | Brown | May 28, 1940 |
| 2,516,544 | Breeze | July 25, 1950 |
| 2,690,248 | McCowall | Sept. 28, 1954 |
| 2,743,792 | Ransom | May 1, 1956 |

FOREIGN PATENTS

| | | |
|---|---|---|
| 17,189 | Great Britain | June 22, 1905 |
| 580,127 | Great Britain | June 28, 1946 |